United States Patent

Oomori et al.

[11] Patent Number: 5,333,914
[45] Date of Patent: Aug. 2, 1994

[54] HOSE DEVICE

[75] Inventors: Norio Oomori; Fumio Ikeda; Keiichi Kodama; Makoto Kanai; Tatsuya Terayama, all of Aichi, Japan

[73] Assignee: Toyoda Gosei Co., Ltd., Nishikasugai, Japan

[21] Appl. No.: 4,064

[22] Filed: Jan. 13, 1993

[30] Foreign Application Priority Data

Jan. 17, 1992 [JP] Japan .................................. 4-006578
Apr. 24, 1992 [JP] Japan .................................. 4-131798
Jun. 8, 1992 [JP] Japan ........................... 4-038711[U]

[51] Int. Cl.$^5$ .............................................. F16L 11/12
[52] U.S. Cl. ........................................ 285/54; 285/62; 285/119; 285/373; 285/256
[58] Field of Search ................. 285/62, 242, 243, 373, 285/252, 256, 921, 54, 119; 24/278, 487, 543

[56] References Cited

U.S. PATENT DOCUMENTS

| | | | |
|---|---|---|---|
| 2,185,741 | 1/1940 | Sorg et al. | 285/253 X |
| 3,673,541 | 6/1972 | Volinskie | 285/119 X |
| 4,012,091 | 3/1977 | Westergren | 285/7 X |
| 4,128,918 | 12/1978 | Wenk | 24/543 X |
| 4,470,622 | 9/1984 | Pate et al. | 285/921 X |
| 4,486,036 | 12/1984 | Storke et al. | 285/242 X |
| 5,074,600 | 12/1991 | Weinhold | 285/243 |
| 5,109,568 | 5/1992 | Rohn et al. | 285/7 |

FOREIGN PATENT DOCUMENTS

| | | |
|---|---|---|
| 57-176996 | 11/1982 | Japan . |
| 62-171371 | 10/1987 | Japan . |
| 1109405 | 7/1989 | Japan . |
| 1031403 | 6/1966 | United Kingdom ............... 285/252 |

Primary Examiner—Dave W. Arola
Attorney, Agent, or Firm—Cushman, Darby & Cushman

[57] ABSTRACT

Disclosed is a hose unit including harnesses which can be easily attached to and detached from the other portion of the unit at the time of fastening thereof to the body of a motor vehicle or the like and which hardly undergoes stress even at the time of vibration or torsion of the hose of the unit. The hose unit includes the hose to which respective end metal members are secured. Holders are removably fastened to these members. One harness extends along the hose and is fastened to the holders and another harness is connected to the former through the holders and extends therefrom. Also disclosed is a special hose clamp.

5 Claims, 6 Drawing Sheets

HOSE DEVICE

BACKGROUND OF THE INVENTION

The present invention relates to a hose device including a harness connected to a vehicle speed sensor or the like, and also relates to a holder, more particularly to a holder which is firmly engaged on the sleeve of a metal base for a hose.

A vehicle speed sensor for detecting the speed of a motor vehicle in terms of the revolution of the wheel thereof is generally used. The sensor is secured to the vehicle near the wheel so that a harness connected to the sensor and protected by a protector extends from the tire housing space of the vehicle into the engine room thereof along a brake hose.

A large space needs to be provided around the harness in order to prevent the harness from interfering with other components of the vehicle when the harness swings during the movement of the vehicle. Since both the harness and the brake hose are located in the tire housing space, it is difficult to provide the large space around the harness, the number of the components of the vehicle is larger, and the efficiency of assembly of them is lower.

To solve these problems, integrally coupling a brake house and a harness with each other was conceived. As a result, a number of proposals were made. For example, it was disclosed in Unexamined Japanese Utility Model Publication No. 71371/87 that a harness is partly embedded in a brake hose, and exits through an end metal member for the hose. Besides, it was disclosed in Unexamined Japanese Utility Model Publication No. 109405/89 that a harness is partly embedded in a brake hose, and exits from the end of the hose. It was also disclosed in that Publication No. 109405/89 that a harness is partly embedded in a harness coating portion integrated with the coating rubber of a brake hose. Furthermore, it was disclosed in the former publication No. 171371/87 that a spirally wound harness is partly embedded in a brake hose, and exits from the end of the hose.

As for the disclosed case that the harness exits through the end metal member for the hose,. the member needs to have a through hole for passing the harness through the member. For that reason, the number of the steps for processing the member is larger. Since the harness needs to exit via the through hole before the end metal member is secured to the hose, it is difficult to adjust the exit position of the harness at the time of fastening of the hose to the body of a vehicle or the like in order to prevent the harness from interfering with the work of the fastening.

As for the disclosed case that the harness exits from the end of the hose, the hose is likely to undergo vibration or torsion at the end thereof due to the movement of the tire of a motor vehicle or the like so that the harness does not follow the vibration or torsion well enough to prevent its disconnection.

As for the disclosed case that the harness is partly embedded in the hose or the harness coating portion, the embedding needs to be perrosined before the end metal member is pressed onto the hose. However, the harness is likely to interfere with the work of the pressing.

As for each of the disclosed cases, the hose is likely to undergo vibration or torsion at the end thereof due to the bound or rebound of the tire of a motor vehicle or the like so that the harness does not follow the vibration or torsion at the end of the hose well enough to avoid receiving excessive tension.

A clamp has been used to hold a tubular member such as a hose and a pipe in place. For that purpose, the clamp is firmly engaged on the tubular member and fastened in a prescribed position. The holder needs to be stably secured to the tubular member. It is undesirable in many cases that the holder and the tubular member move relative to each other in the axial or circumferential direction thereof. In the case that the holder is secured to an elastic tubular member such as a rubber hose, they can be firmly engaged with each other by a force of such magnitude as to deform the member elastically, to cause the elastic repulsive force thereof to prevent them from moving relative to each other. However, in the case that the holder is supported to a tubular member such as a metal member, which is difficult to deform elastically, some processing or device needs to be performed to prevent them from moving relative to each other. For example, the cross section of the holding portion of the holder and that of the tubular member are shaped non-circularly, to prevent them from moving relative to each other in the circumferential direction thereof. However, it can be difficult to shape the cross section of the tubular member non-circularly. For example, it is required that the sleeve of an end metal member for a hose has a circular cross section, and a holder is secured supported to the sleeve. However, the existence of the holder suitable for the circular cross section of the sleeve and capable of being supported thereto so that they are surely prevented from moving relative to each other has not been known to the public.

SUMMARY OF THE INVENTION

The present invention was made in order to solve the problems described above.

It is the first object of the present invention to provide a hose device including harness which can be easily attached to and detached from the hose device, and hardly undergo stress even at the time of vibration or torsion of the hose.

According to the first aspect of the present invention, the hose device includes a hose which has secured to it at least at one end a metal base member to which a holder member is detachably fixed and a harness extends along the hose, the harness being fastened to the holder member and extending from the holder member.

Since the harness is indirectly fastened to the metal base through the holder member, a secured portion of the harness is hardly affected by the vibration or torsion of the hose because the harness is in secured condition. Therefore, the harness does not undergo such stress as to break down the harness.

Since the holder member is detachably fastened to the metal base, the holder member can be detached together with the harness from the metal base to prevent the harness from interfering with the work of fastening of the hose unit to the body of a motor vehicle or the like.

Moreover, a harness extending along the hose and fastened to the holder, and another harness connected to the o former through the holder and extending therefrom may differ from each other in kind. In other words, two different kinds of harnesses may be connected to each other through the holder. The harnesses may thus be made different from each other in thickness and other specifications so as to increase the degree of freedom of design of the hose device.

It is second object of the present invention to provide a reinforced hose device which is improved in the property of fastening the unit to the body of a motor vehicle or the like, and includes a hose and a harness which hardly undergoes stress even at the time of vibration or torsion of the hose.

According to second aspect of the present invention, a reinforced hose device includes a hose having a metal base secured at least one end of the hose, and a hard spiral protector in which a harness is embedded and which is fitted around the hose.

Since the harness is embedded or inserted in the spiral protector, the harness is indirectly fastened to the body of the motor vehicle or the like by fastening the hose thereto because the hose is positioned into the spiral protector. For that reason, even if the hose undergoes vibration or torsion, the harness and the spiral protector are not directly affected by the vibration or torsion and therefore hardly undergo vibration or torsion which would overstress the harness and the protector to subject the harness to break down or the like.

Since the inside diameter of the spiral of the protector is larger than the outside diameter of the hose, the protector can be easily fitted around the hose. The metal base can be pressed to the hose while the spiral protector fitted around the hose is compressed to prevent the harness from interfering with the work of the pressing.

The third object of the present invention is to provide a sleeve clamp for clamping a sleeve of a metal base of hose to avoid the movement of the sleeve clamp in the axial and circumferential directions thereof.

According to the third aspect of the present invention, there is provided that a sleeve clamp including a first holding portion having a first engagement portion at one end of the first holding portion, and a second holding portion having a second engagement portion at one end of the second holding portion, one end of the second holding portion continuing the other end of said first engagement part and extending opposite to the first engagement portion, and the other end of second holding portion disposed at the second holding portion, wherein the first and second engagement parts are coupled from each other to hold the sleeve of the metal base of the hose between the first and second holding portions and the sleeve of the metal member is secured to the hose by pressing, and wherein the sleeve is pressed at a plurality of points, at least one of first and second holding portions having a convex engagement portion formed at an inner circumferential surface and the engagement convex portion is fitted to a concave portion formed at the sleeve by pressing.

The sleeve of metal member is secured to the hose by pressing. According to the present invention, the metal sleeve of the hose is firmly engaged with the hose by pressing at a plurality of points. A pressed recess serving as a ring shaped is formed on the sleeve by pressing at a plurality of points and the pressed recess exists in partially axial direction of the sleeve and a convex engagement portion, and a concave engagement portion are alternatively formed on the pressed recess in circumferential direction and the convex portion is formed by protruded sleeve portion when the concave portion is formed by pressing.

Hence, according to the present invention, the sleeve clamp has a convex engagement portion at the inner circumferential surface of at least one of the first and second holding portions of the sleeve, and the convex engagement portion is fitted on a concave engagement portion formed at the pressed recess by pressing. Therefore, the sleeve is disposed between the first and second holding portions, and the sleeve is held by the first and second holding portions to engage the engagement convex portions with the concave engagement portion formed in the pressed recess.

After that, the sleeve is held on the sleeve clamp by o the engagement of first and second engagement portions. In this condition, the convex engagement portion is positioned in the pressed recess to abut against the inner surface of the pressed recess. Therefore, the movement of the sleeve clamp in the axial direction is limited, whereas the convex engagement portion is abutted against the convex portion existing in the circumferential direction of the concave engagement portion at the pressed recess to limit the movement of the sleeve clamp in the circumferential direction.

DESCRIPTION OF THE PREFERRED EMBODIMENTS

Preferred embodiments will be now described hereinafter with the references to the drawings.

Figure 1:
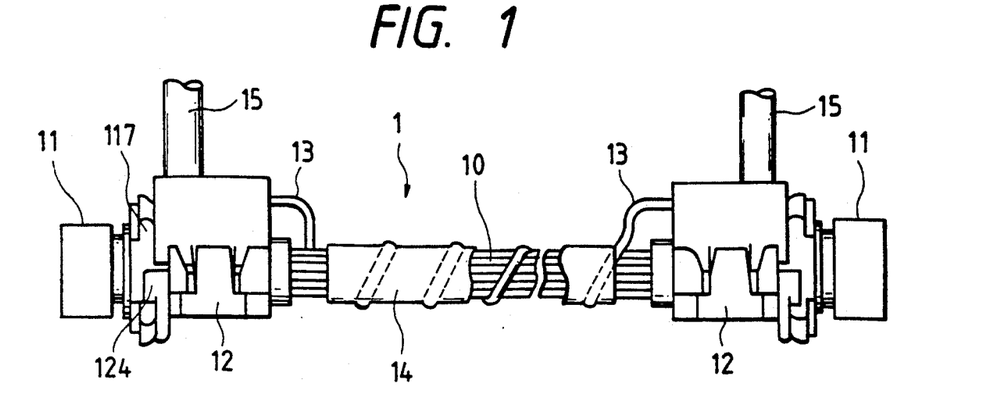
FIG. 1 is a side view of a hose devise which includes harness and represents a first embodiment of the present invention.
Figure 4:
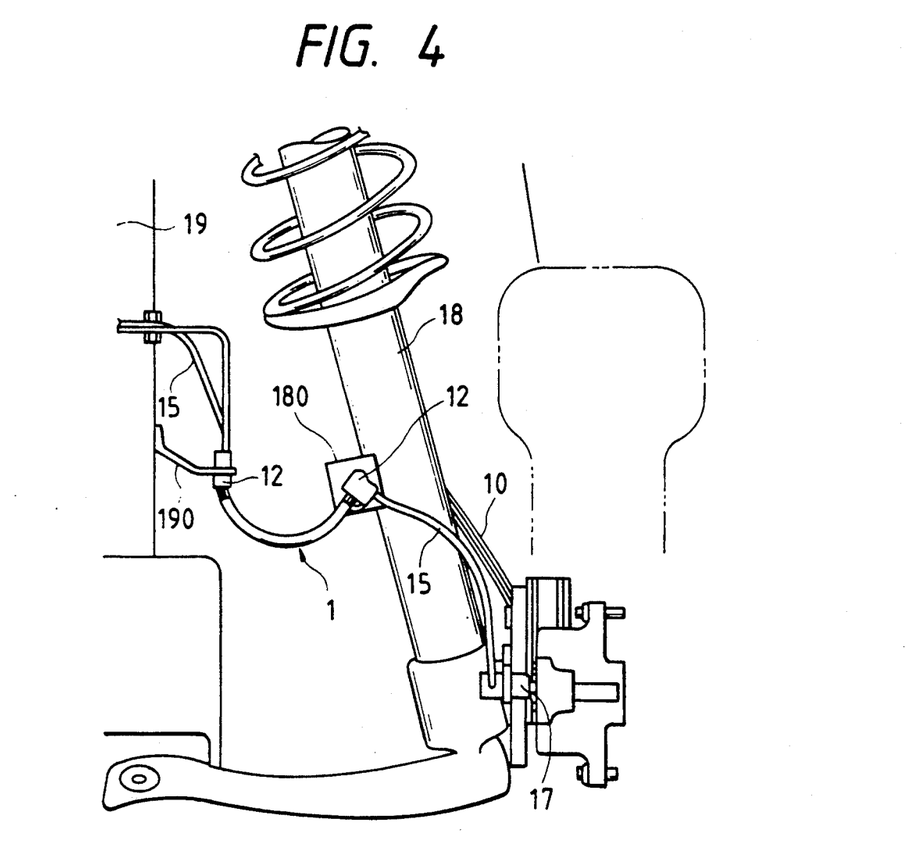
FIG. 4 is a view of the unit to illustrate the fastening thereof to the body of a motor vehicle.

FIG. 1 shows a hose device 1 which is the first embodiment of the present invention. The hose device 1 includes harness, and can be used as a brake hose device for motor vehicle as shown in FIG. 4. The harness can be used for transmitting a signal from a vehicle speed sensor 17.

The hose device 1 comprises: a brake hose 10, and metal bases 11 secured to both ends of the hose device 1, respectively, holder members 12 detachably fastened to the metal bases, respectively, a first harness 13 spirally wound around the brake hose 10 and a tube 14 coats or covers the surfaces of the first harness 13 and the brake hose 10, and second harness 15 extended from the holder men%bets, respectively.

The brake hose 10 is a conventional three-layer hose having inner and outer layers and an intermediate layer of a woven yarn.

Each of the metal bases 11 includes a cylindrical engagement portion 111 (FIG. 2) which is engaged with another member to constitute a fluid passage, a nipple 112 extending opposite to the cylindrical engagement portion 111, a sleeve 113 positioned outside of the nipple 112 and axially extending coaxially therewith, a flange portion 114 projected from the cylindrical engagement portion 111 toward the radial direction of the metal bases 11, a stepped portion 115 provided on the outer portion of the flange portion 114 in the axial direction, a diameter of the stepped portion 115 being smaller than that of flange portion 114, and a neck portion 116 provided outside the stepped portion 115 and being smaller in diameter than the stepped portion 115. The nipple 112 is inserted onto a center hole of the brake hose 10 which is inserted into the sleeve 113 to abut an outer surface of the brake hose 10 against an inner surface of the sleeve 113.

Figure 2:
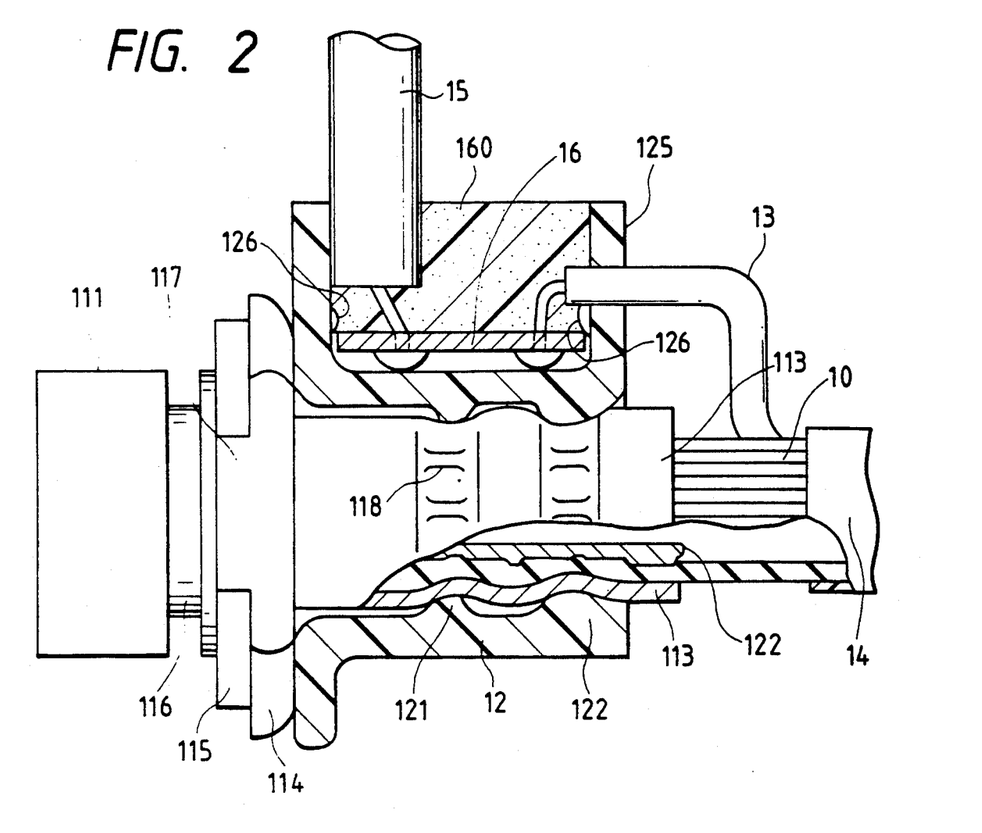
FIG. 2 is a sectional view of a major part of the hose device.

After that, the outer surface of the sleeve 113 is pressed to hold the brake hose 10 between the nipple 112 and the sleeve 113. Flat surfaces 117 are formed on the right and left sides of each the flange 114 and the stepped portion 115 so that the cross section of each of the flange portion 114 and the stepped portion 115 is not uniform in diameter.

As shown in FIG. 4, the metal bases 11 are inserted into through holes formed in brackets 180 and 190, respectively, from a side of the cylindrical engagement portion 111 so that each of the flange portions 114 is brought into contact with the bracket 180 or 190 to determine the arrangement of each metal base 11. Clips (not shown in the drawings) are fitted on each neck portion 116 of the metal base 11 projected from the bracket 180 so that each of metal bases 11 is fastened to the brackets 180 and 190, respectively.

Figure 3:
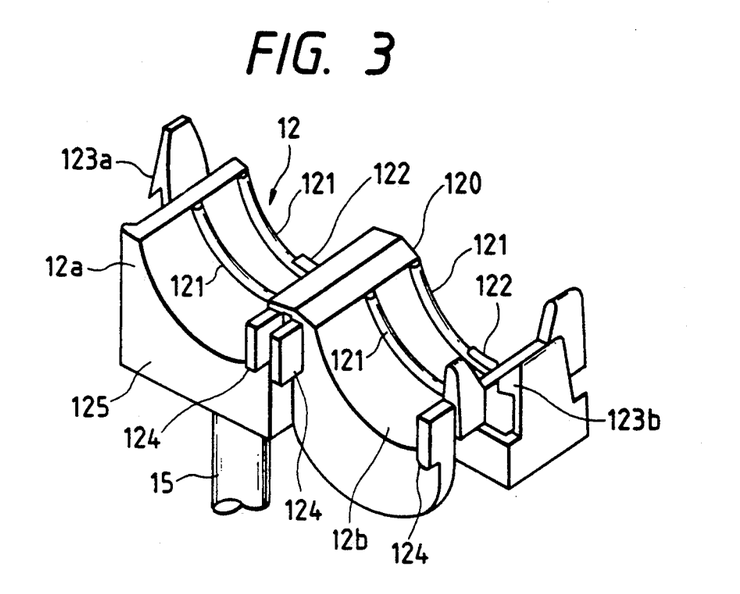
FIG. 3 is a perspective view of the holder member of the hose device in the state that the holder member is open.

The holder member 12 is made of a resin such as polyamide, polypropylene and cross-linked polypropylene. The holder member 12 is nearly cylindrically shaped, as shown in FIG. 3, and is constituted by a pair of split units 12a and 12b which are coupled to each other at a hinge portion 120 of the holder member 12. Each of the split units 12a and 12b has a locking projection 121 in the inner circumferential surface of the split units 12a and 12b, respectively. Two locking projections 121 per unit are shown. Each of the locking projections 121 extends along the inner circumferential direction of the split unit 12a and 12b, respectively. These locking projections 121 correspond to the position of a pressed portion. A pair of protrusions 122 are located along the locking projections 121 of the split units 12a and 12b, respectively, in such a manner that the protrusions 122 are confronted from each other along a circumferential at 180 degrees.

The split units 12a and 12b have pawls 123a and 123b positioned opposite to a hinge portion 120 so that when the split units 12a and 12b are rotated around the hinge portion 120 to engage the pawls 123a and 123b catch and bold them together.

Three flange stoppers 124 are projected from one end of the splits units 12a and 12b in the axial direction thereof.

The split units 12a of the holder member 12 includes a box-shaped pot portion 125 containing a base board 16 (FIG. 2) near the bottom portion thereof. A semi-circular projection 126 projects from the inner wall of the box-shaped pot portion 125 to limit the movement of the base board 16 in the direction toward the opening portion of the box-shaped pot portion 125. Wire of the first and second harnesses 13 and 15 are bonded on the base board 16 to electrically connect to each other. The box-like part 125 is filled with an electrically-insulating filling material 160 such as silicon resin and epoxy resin.

The first harness 13 is wound on a peripheral surface of the brake hose 10. After the first harness 13 is spirally wound on the peripheral surface of the brake hose 10, the tube 14 which is made of a thermally shrinkable material covers the first harness 13 and the brake hose 10. Thereafter, the tube 14 is heated to be shrunk to coat the harness 13 and the brake hose 10. Therefore, the first harness 13 is designed to move the tube 14 in a longitudinal direction as a winding direction of first harness 13 to easily follow the bending and torsion of the brake hose 10. The tube 14 has a function of protective layer so that even if the coating layer of the brake cord 13 becomes thinner, the tube can be protected from chipping.

Therefore, an outside diameter of the first harness 13 can be decreased to reduce the size of the hose device 1 as a whole to improve the disposition space therefor. The first harness 13 extends out of the end of the tube 14 into the boxlike part 125 of the holder member 12 through a hole of the wall of the part in which the wires of the harnesses are soldered to the base plate 16.

The second harness 15 is bonded to the base plate 16 in the box-like part 125 at one end of each conductor of the second harness 15, and is connected to a vehicle speed sensor 17 at the other end of the conductor. Hence, in FIG. 4 harness 15 extends between the holders 12 only electrically by virtue of its conductor being electrically connected in each holder to the conductor of harness 13. The second harness 15 has a thick coating layer, and has a larger outside diameter than the first harness 13.

For example, the hose device is provided near the tire of the motor vehicle, as shown in FIG. 4. Namely, one of the metal bases 11 is secured to the bracket 180 projected from the shock absorber 18. The proximal portion of the second harness 15 extending from the holding member 12 is connected to the speed sensor 17 which is secured near the wheel of the vehicle. The other metal base 11 is fixed to the bracket 190 projected from a body of the vehicle and the second harness 15 extending from the holding member 12 is extended into an engine room 19 of the vehicle.

As shown in FIG. 4, when the hose device 1 with the harness is assembled, each of the metal bases 11 is fixed to the brackets 180 and 190, respectively. If the first and second harnesses 13 and 15 interfere with the work of securing the hose device, the engagement of the pawls 123a and 123b of the holder member 12 is released to disconnect the holder member 12 from the metal base 11 to allow the metal bases 11 to be easily secured to the brackets 180 and 190, respectively.

When the holder member 12 is secured to the metal base 11 again, the end surface of the split units 12a and 12b abut against the flange portion 114 to determine the position thereof. Thereafter, the split units 12a and 12b are rotated to engage the pawls 123a and 123b so that the locking projection 121 is locked along the pressed portion 118 to engage the protrusion 122 with the recess portion of the pressed portion 118 so as to limit the movement relative to the metal base 11 in the axial direction of the hose device. Moreover, flange stopper 124 is abutted against the flat portion 117 so as to limit the movement relative to metal base 11 in the circumferential direction thereof.

Although the box-like part 125 is filled with the electrically insulating filling material 160 to secure the base plate 16 to the box-like part 125, the present invention employs the structure that the base plate 16 is mechanically secured to the box-like part 125 and covered with a lid or the like. In addition, the first and second harnesses 13 and 15 may be coupled to the base plate 16 not by soldering but by connecters. Moreover, the shape of the holder member 12 is not limited to that shown. For example, the holder member 12 may be shaped as a cylindrical body with a slit to utilize the elastic deformation of the holder member with the slit.

According to the first embodiment of the present invention as above described, the hose device with the harness is easily detached at the time of fastening the hose device on the vehicle. Therefore, it is easy to prevent the harnesses from interfering with the fastening work or performance of the work in a narrow space. The first and second harnesses are indirectly secured respectively to the metal members through the holder member and are wound around the hose so that the first and second harnesses are hardly affected by possible vibration or torsion of the hose which could cause hose disconnection or break down. Since the outer diameter of the first harness 13 is small, the size and weight of the hose device 1 are reduced for enhancing the space or the like.

Therefore, according to the first embodiment of the present invention, the life of the first and second harnesses is enhanced, and the efficiency of fastening of the hose device to the body of the vehicle is increased to reduce the manufacturing cost thereof.

The second embodiment of the present invention is now described.

Figure 5:
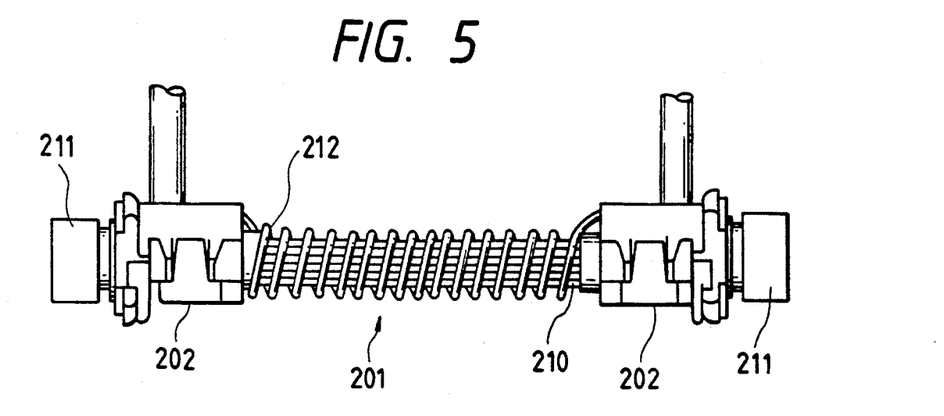
FIG. 5 is a side view of a reinforced hose device which includes harness and represents a second embodiment of the present invention.

As shown in FIG. 5, a brake hose device uniformly contains a harness. This brake hose 201 is used as a brake hose for the vehicle, and the harness is used for transmitting a signal from the speed sensor of the vehicle.

The hose device 201 includes a brake hose 210, a pair of metal bases 211 secured to opposite ends of the brake hose 210, a spiral protector 212 separately spirally inserted over the brake hose, a harness 213 (FIG. 7) embedded into the spiral protector 212 so as to be fully covered with the spiral protector 212, and clamps 202 holding opposite ends of the harness, respectively. An inner diameter of the spiral protector 212 is larger than an outer diameter of the brake hose to provide a space between the spiral protector 212 and the brake hose 210.

Figure 6:
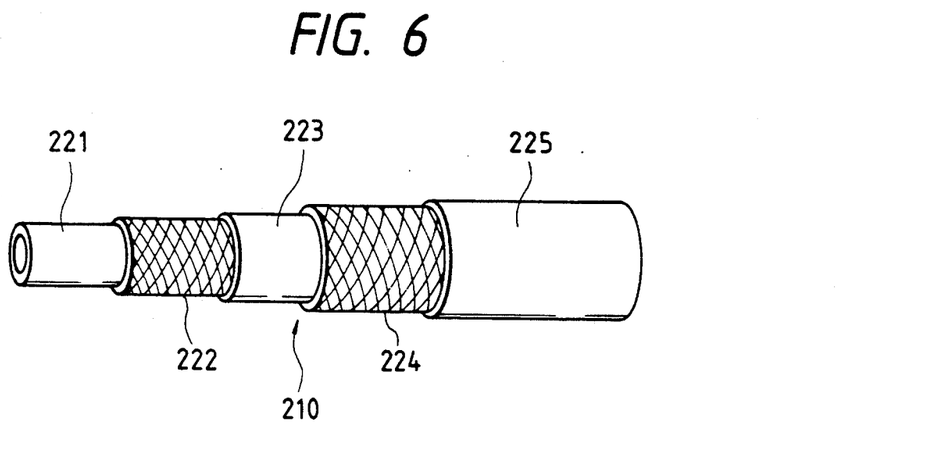
FIG. 6 is a cutaway view of a major part of the hose device shown in FIG. 5.

The brake hose 210 is a conventional one including inner and outer tube layers and an intermediate layer of a woven yarn disposed between the inner and the outer tube layers. For example, as shown in FIG. 6, the brake hose 210 includes an inner rubber tube layer 221 made of SBR or EPDM, an inner woven tube layer 222 made of a polyester or vinylon yarn, an intermediate rubber layer 223 made of natural rubber or butyl rubber, an outer woven layer 224 made of polyester or vinyl yarn, and outer rubber tube layer 225 made of CR or EPDM.

Figure 7:
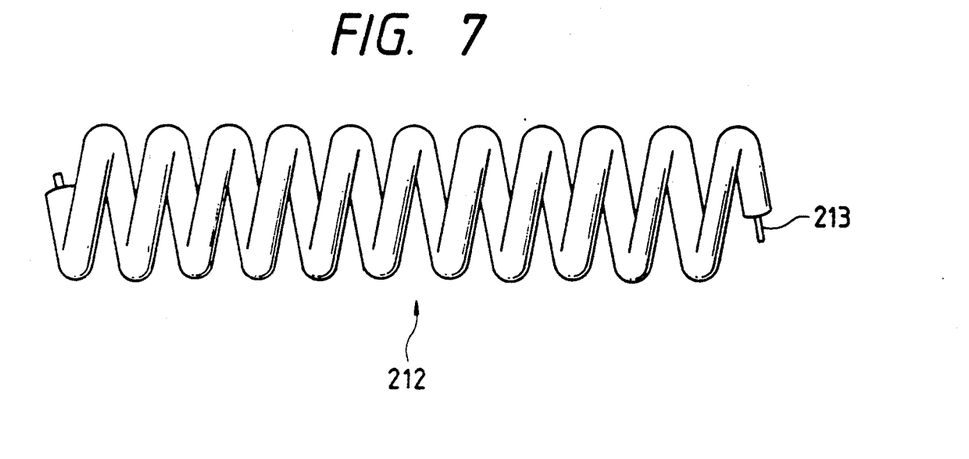
FIG. 7 is a side view of the spiral protector of the hose device shown in FIG. 5.

The spiral protector 212, which is fitted in the outer portion of the brake hose 210, should be hard and shock resistant to protect the brake hose 210 from any damaging thing such as a flying pebble. For example, the spiral protector 212 is made of a synthetic resin such as polyurethane, polyvinyl chloride and polyamide, which is heat resistant and shock resistant. The spiral protector 212 is spirally formed by extrusion with a harness in such a manner that the spiral protector 212 uniformly coats the harness 213 in the center thereof, as shown in FIG. 7.

The inner diameter of the spiral protector 212 spirally wound is smaller than the outer diameter of metal bases 211 so o that the spiral protector 212 could be compressed to one end thereof to make it easy to press the metal base 211 to the brake hose 210 at the end thereof. Moreover, the movement of the spiral protector 212 is restricted by the metal bases 211.

Figure 8:
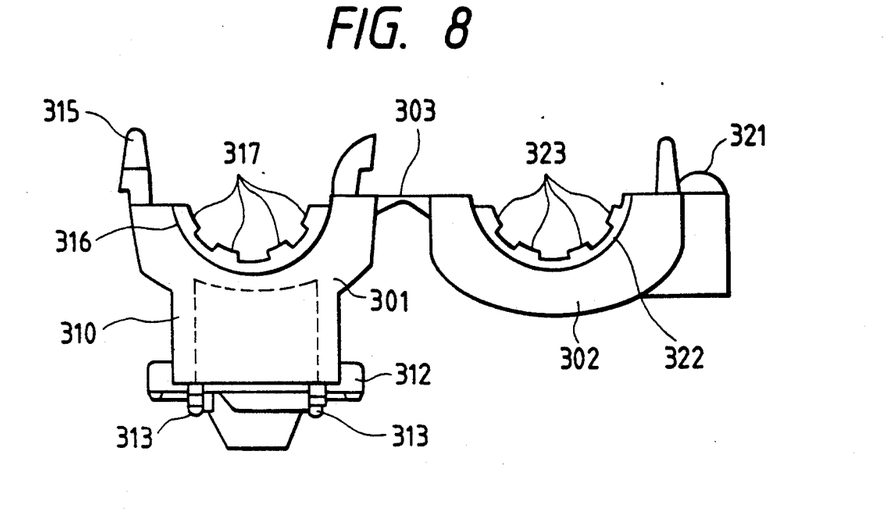
FIG. 8 is a front view of a holder device and represents a third embodiment of the present invention.

On the other hand, the spiral protector 212 is clamped as shown in FIG. 8 to the metal members 211 to secure both end of the spiral protector 212 so that the portion, which surrounds the brake hose 210, is flexible. Moreover, both ends of the spiral protector 212 are adhered to the metal bases by adhesive to secure the brake hose 210. It is preferable that there is a gap between the spiral windings of the spiral protector 212 to make it flexible. However, the gap should be small enough to prevent a flying pebble or the like from colliding against the hose 210.

Accordingly, the hose device is uniformly provided with the harness of the second embodiment of the present invention and since the harness 213 is still spiral and flexible after being attached to the brake hose 210, the harness can be moved so not to interfere with the work of pressing the metal bases 211 to the brake hose 210. Therefore, the hose device 201 can be easily assembled. Since the harness 213 is spirally wound together with the spiral protector 212 around the hose 210 and flexible in the spiral protector 212, the cord is hardly affected by the possibility of vibration and torsion of the brake hose 210. Therefore, the life of the harness 213 is lengthened. The fact that the harness 213 is coated with the spiral protector 212 made of a shock-resisting resin also serves to lengthen the life of the harness 213. Since the efficiency of fastening of the harness 213 to the brake hose 210 is enhanced, the cost of assembly of the hose device 201 is reduced. Since the spiral protector is normally out of contact with the brake hose 210, the hose is not abraded by the protector and is flexible enough.

Figure 9:
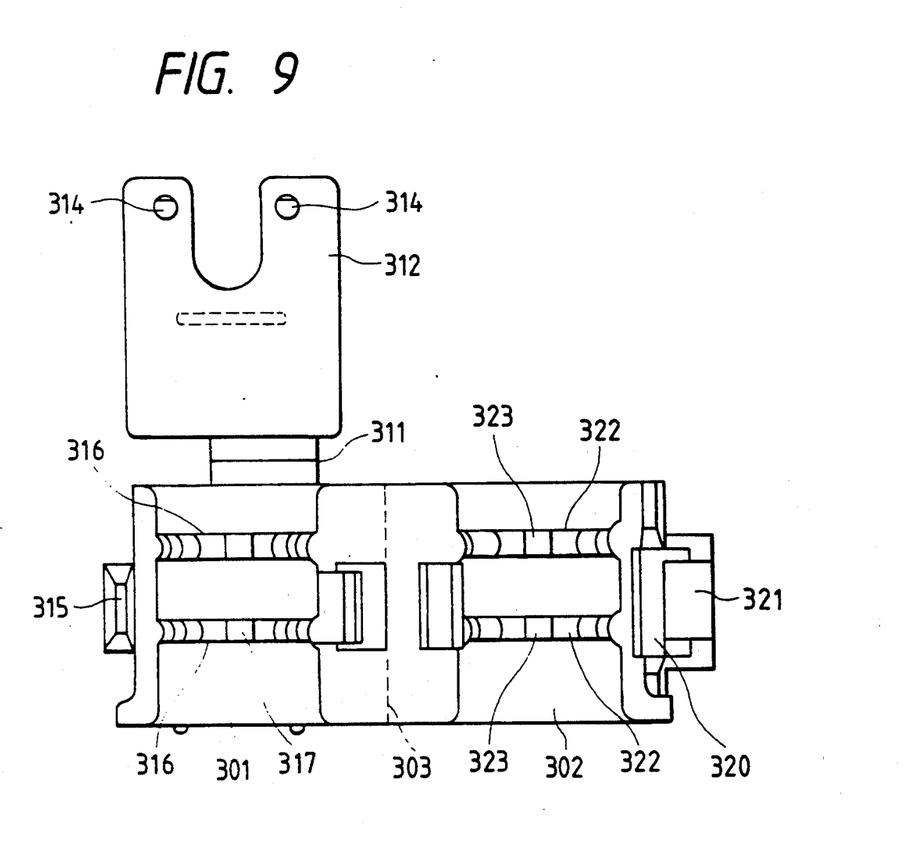
FIG. 9 is a plan view of the holder device of FIG. 8.

FIGS. 8 and 9 show a sleeve clamp of the third embodiment of the present invention.

The sleeve clamp has a substantially cylindrical body including a first semicylindrical holding portion 301, a second semicylindrical holding portion 302, and a first hinge portion 303 coupling the first and second holding portions 301 and 302 to each other.

The first semicylindrical holding portion 301 is provided on a pot-shaped portion 310, shaped box-like at the outer peripheral surface thereof, a lid 312 pivotally coupled with a second hinge portion 311 at one end of the first semicylindrical holding portion 301 in an axial direction of the pot-shaped portion 310 so that the lid 312 pivotally is moved to close or open the pot-shaped portion 310. A pair of protrusions 313 are projected from the pot-shaped portion 310. The protrusions 313 are engaged with first engagement holes 314 formed on the lid 312 to secure the pot-shaped portion 310 in the closed condition.

Moreover, a first engagement pawl 315 serving as a first engaging portion is projectly provided at the other end portion of the first semicylindrical holding portion 301 opposite to the first hinge portion 303. A pair of first projections 316 are provided at an inner peripheral surface of the first semicylindrical holding portion 301 in such a manner that the projections 316, which are parallel to each other, extend in the circumferential direction of the first semicylindrical holding portion 301. Four first engagement convex portions 317 are further projected on the first projections 316 at a predetermined interval in the longitudinal direction.

The second semicylindrical holding portion 302 is connected to the first semicylindrical holding portion 301 through the first hinge portion 303. The second semicylindrical holding portion 302 contains a second engagement hole 320 and a second engagement pawl 321 serving as a second engaging portion at a side opposite to the first hinge portion 303. When the first and second semicylindrical holding portions 301 and 302 are closed to each other around the first hinge portion 303, the first engagement pawl 315 is engaged with the second engagement pawl 321 so that the first and second semicylindrical holding portions 301 and 302 are secured to each other in a nearly cylindrical form.

A pair of second projections 322 are provided at an inner peripheral surface of the second semicylindrical holding portion 302 in such a manner that the second projections 322, which are parallel to each other, extend in the circumferential direction of the second semicylindrical holding portion 302. Four second engagement convex portions 323 are further projected on the projections 322 at a predetermined interval in the longitudinal direction. When the first and second semicylindrical holding portions 301 and 302 are engaged, the second projections 322 are confronted with the first projections 316 in a nearly ring form.

An example of the use of this embodiment of the sleeve clamp having structure described above is now described.

Figure 10:
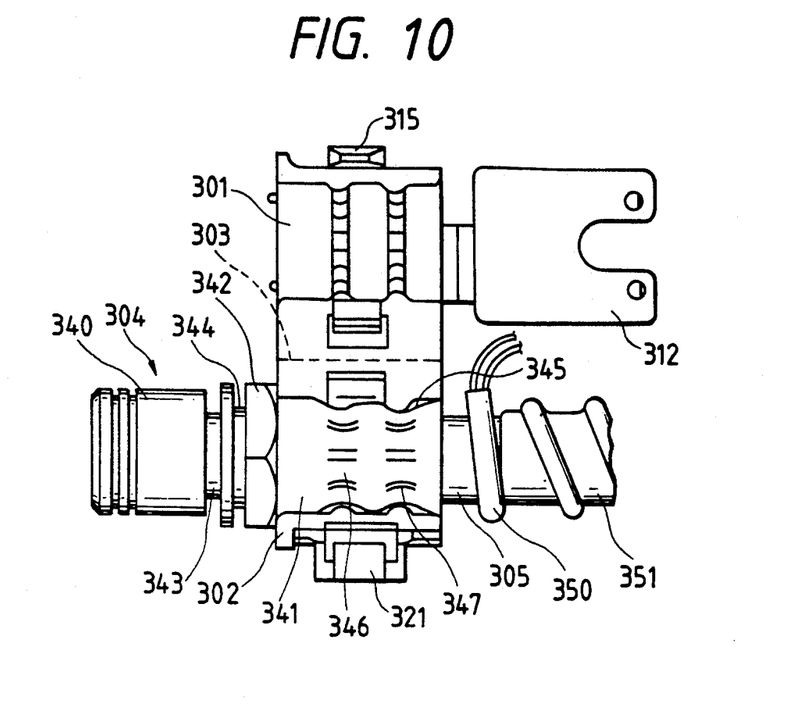
FIG. 10 is a plan view of the FIG. 8 holder in the state that it is being firmly engaged on the sleeve of a hose device including harness.

As shown in FIG. 10, hose 305 has a metal base 304 which is secured to the hose 305. A sleeve 341 of the metal base 304 is disposed on the second semicylindrical holding portion 302. The metal base 304 is constituted of a cylindrical engagement portion 340 which is engaged with another member (not shown) to form a fluid passage, the sleeve 341 extending opposite to the cylindrical engagement portion 340, a flange portion 342 having a hexagonal shaped outer circumference, the flange portion 342 projected from the cylindrical engagement portion 340 toward a radial direction, a neck portion 343 having a small diameter provided between the cylindrical engagement portion 340 and the flange portion 342 and an annular groove 344 provided in the flange portion 342.

After the hose 305 is inserted into the sleeve 341, the sleeve 341 is pressed by an outer peripheral surface thereof to secure the metal base 341 to the hose 305. Therefore, two grooves 345 are formed on whole outer peripheral surface of the sleeve 341 by pressing. The pressed grooves 345 extend along the total circumference of the sleeve 341. Eight second engagement convex portions 347 and eight second engagement concave portions 346 are alternately provided on the pressed grooves 345.

On the other hand, a first harness 350 is spirally wound around the hose 305, and the first harness 350 is coated with a thermally shrinkable tube 351 and the end portion of the harness 350 is soldered to a base plate 352 (FIG. 11) for electrical connection to the second harness 353.

Figure 11:
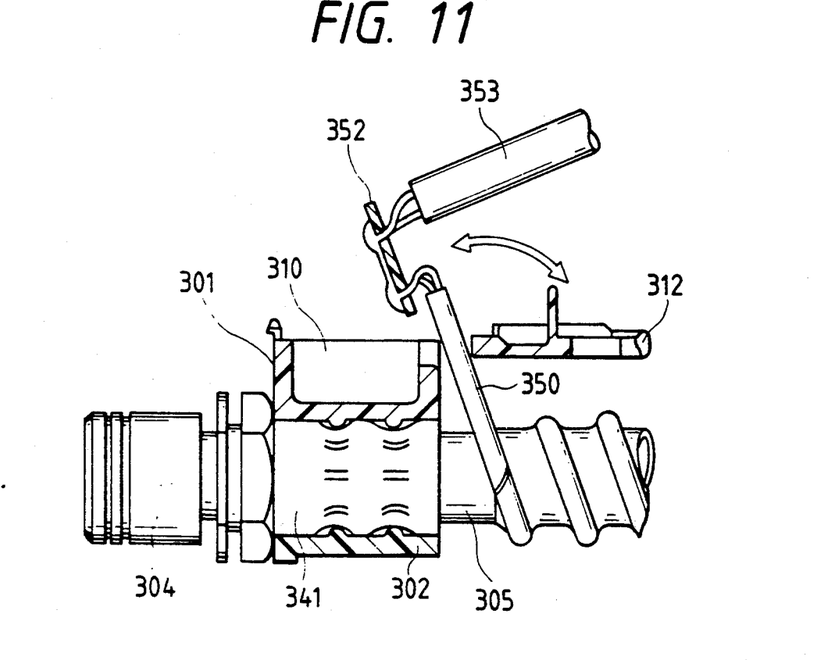
FIG. 11 is a view of the FIG. 8 holder illustrating a way to fasten the harness to the holder device.

Next, the first semicylindrical holding portion 301 rotates around the first hinge portion 303 so that the first and second engagement pawls 315 and 321 are engaged with each other to fasten the first and second semicylindrical holding portions 301 and 302 and to hold the sleeve 341. At this time, the first and second convex engagement portions 317 and 323 are formed in such a manner that the arrangement and size of the first and second convex engagement portions 317 and 323 corresponds to that of the pressed groove 345 and the second concave engagement portions 346. After the base plate 352 is disposed in the pot-shaped portion 310, the electrically insulating filling material (not shown) is filled with the pot-shaped portion 310 to secure the base plate 352. Then the lid 312 rotates to close an opening portion of the pot-shaped portion 310.

Figure 12:
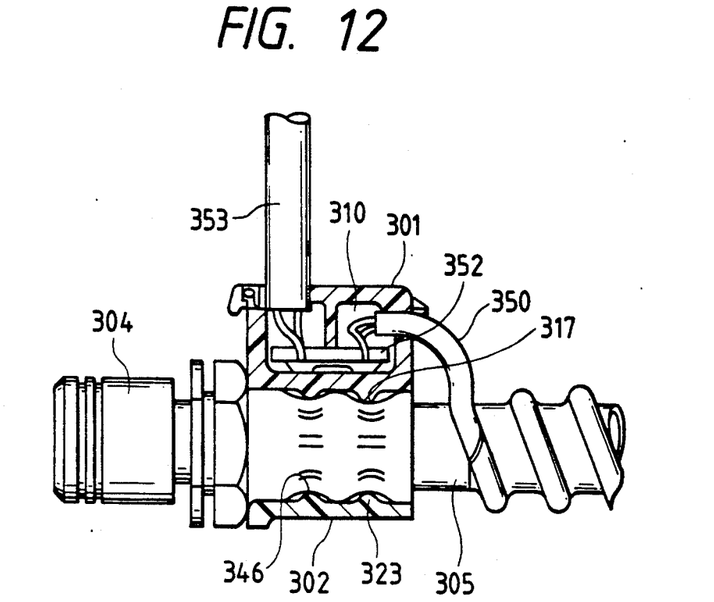
FIG. 12 is a longitudinal sectional view of the FIG. 8 holder device in the state that it is firmly engaged on the sleeve.
Figure 13:
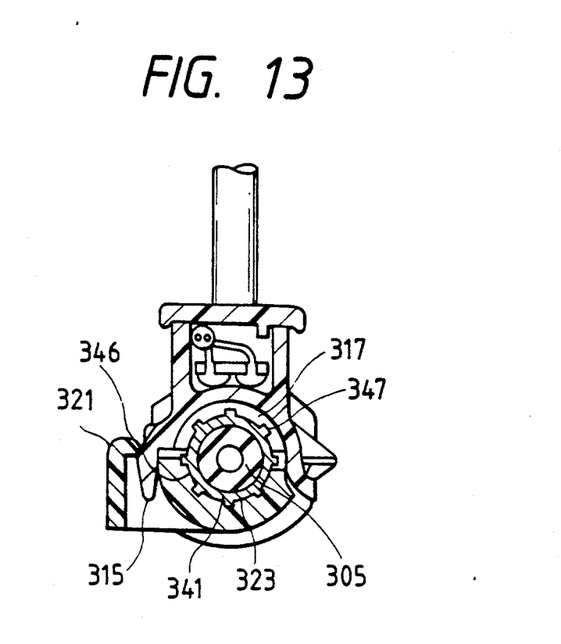
FIG. 13 is a cross-sectional view of the FIG. 8 holder device in the state that it is firmly engaged on the sleeve.

FIGS. 12 and 13 show sectional views of the structure described above. In this structure, the first and second convex engagement portions 317 and 323 are engaged with the second engagement concave portions 346 provided on the pressed grooves 345 of the sleeve 341. Therefore, the first and second convex engagement portions 317 and 323 are engaged with the inner peripheral surface of the pressed grooves to limit the movement of the sleeve clamp in the axial direction relative to the metal base 304. The movement of the sleeve clamp in the circumferential direction relative to the metal base 304 is restricted by the engagement between the first and second convex engagement portions 317 and 323 with the second engagement concave portions 346 provided on the pressed grooves 345 of the sleeve 341. Namely, movement of the first and second harness relative to metal base 304 is restricted so as to eliminate possible disconnection or breaking.

In this embodiment, a plurality of the first and second convex portions are provided to engage with a whole second engagement concave portions 346. However, the present invention is not limited to this embodiment. It is capable of employing only one engagement concave portion to ensure the same effect described above.

According to the third embodiment of the present invention, the sleeve secured to the hose by pressing is held to the sleeve clamp to eliminate the relative movement in the axial and circumferential directions.

What is claimed is:

1. A hose device comprising:
   an end metal base member,
   hose end secured to said member;
   a holder removably fastened to said member, said holder including a box-shaped pot portion filled with electrically insulative material; and
   a harness extending along said hose, said harness being fastened to said holder and extending into said electrically insulative material.

2. A hose device as claimed in claim 1, wherein said harness includes a tube covering an outer peripheral surface of said harness, said tube being made of a thermal shrinkable material unit.

3. A hose device as claimed in claim 1, wherein said harness includes a spiral protector integrally formed around said harness.

4. A sleeve clamp comprising:
   first and second holder members, said first holder member having at one end portion a first engagement portion, said second holder member having at one end portion a second engagement portion, said holder members having other end portions hingedly coupled together for opening and closing said clamp, said holder members further including a box-shaped pot portion filled with electrically insulative material, wherein said first and second engagement portions lockingly engage each other when said clamp is closed for holding said clamp secured to a metal base of a hose by pressure exerted on the metal base by said first and second holder members.

5. A sleeve clamp as claimed in claim 4, including a convex engagement portion in an inner circumferential surface of at least one of said first and second holder members to engage a concave portion pressed into a portion of the metal base of the hose.

* * * * *